Figure 1:
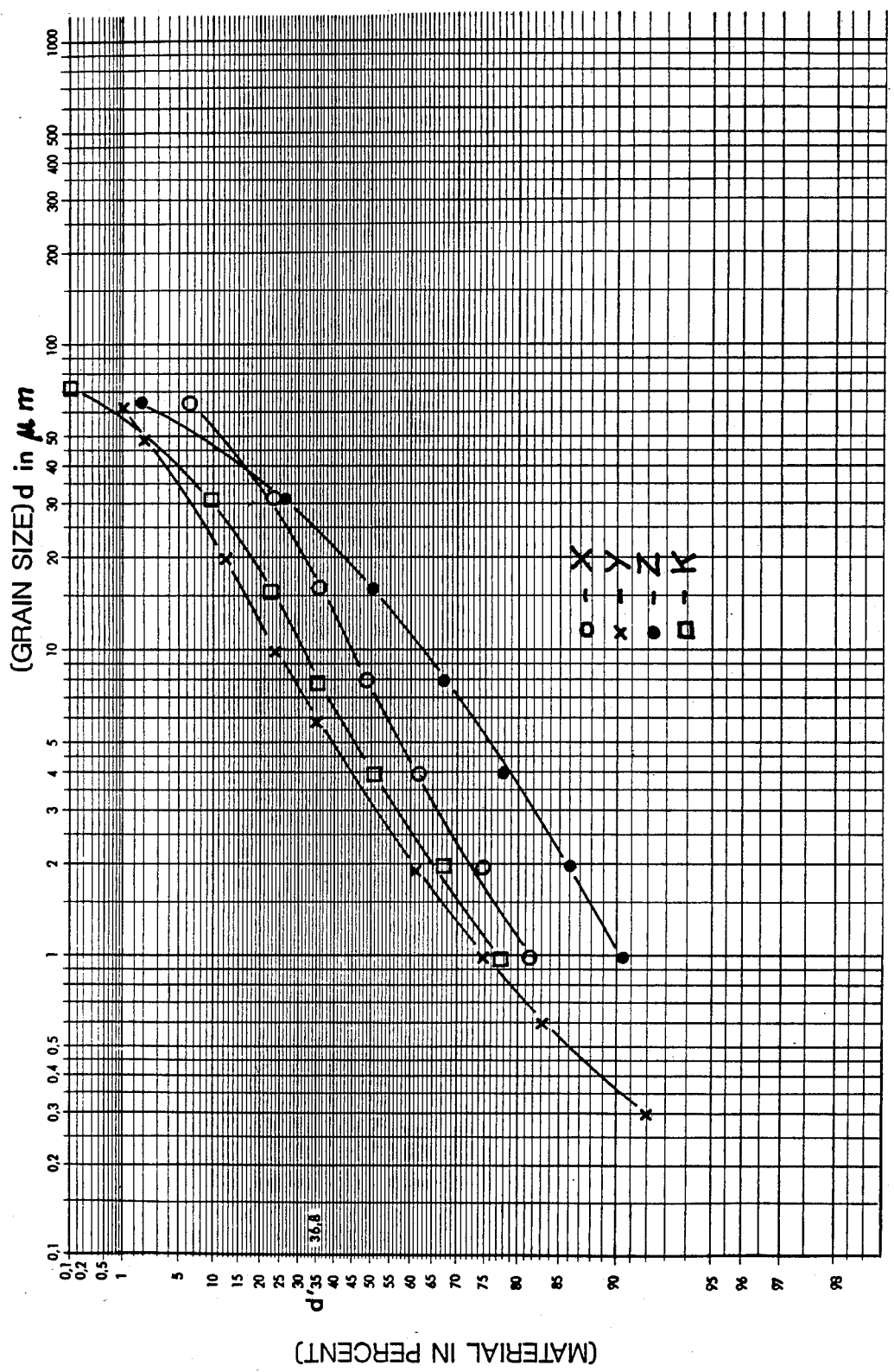

United States Patent [19]
Wyskott et al.

[11] Patent Number: 4,549,906
[45] Date of Patent: Oct. 29, 1985

[54] BASIC FIRE RESISTANT MATERIAL AND SHAPED BODIES THEREFROM

[75] Inventors: Bernd Wyskott; Rainer Prange; Kurt Möller, all of Hagen; Joachim Fleischer, Kaarst, all of Fed. Rep. of Germany

[73] Assignee: Dolomitwerke GmbH, Wulfrath, Fed. Rep. of Germany

[21] Appl. No.: 575,914

[22] Filed: Feb. 1, 1984

[30] Foreign Application Priority Data

Feb. 8, 1983 [DE] Fed. Rep. of Germany ....... 3304119

[51] Int. Cl.$^4$ ................................................. C09D 5/14
[52] U.S. Cl. ........................................ 106/16; 106/17; 106/18; 106/228; 106/260; 252/62; 264/319; 501/109
[58] Field of Search .......................... 106/15.05, 16–18, 106/228, 260; 501/109, 113; 252/62; 264/319

[56] References Cited

U.S. PATENT DOCUMENTS

| | | | |
|---|---|---|---|
| 3,222,196 | 12/1965 | Davies et al. | 501/113 |
| 3,276,889 | 10/1966 | Weaver | 501/109 |
| 3,361,583 | 1/1968 | Elarde et al. | 501/109 |
| 3,414,419 | 12/1968 | Farrington et al. | 501/109 |
| 3,415,667 | 12/1968 | Cummings | 501/109 |
| 3,634,114 | 1/1972 | Lufcy | 501/109 |
| 3,698,922 | 10/1972 | Staut et al. | 501/109 |

Primary Examiner—Lorenzo B. Hayes
Attorney, Agent, or Firm—Collard, Roe & Galgano

[57] ABSTRACT

Basic fire resistant material comprised of burned or calcined sintered dolomite and organic binding means having plastic properties which can be densified at low pressures, whose shaped bodies have intermediate and final strengths in a temperature range between 300° and 1600° C. in which, related to the fire resistant basic materials, the proportion of binding means is 3 to 8% by weight wherein 0.1 to 2% by weight are silicon-organic compounds, and the fire resistant basic materials are from 10 to 15% by weight of particles having a particle size smaller than 45 μm.

8 Claims, 1 Drawing Figure

BASIC FIRE RESISTANT MATERIAL AND SHAPED BODIES THEREFROM

The present invention relates to basic fire resistant material substantially consisting of burned sintered dolomite and organic binding means, which have plastic properties and which can be highly compressed or packed at low pressure. Shaped bodies, fire resistant shaped bodies and their heated or calcined products formed by compressing such material exhibit a high degree of intermediate and final firmness in the temperature range between 300° and 1600° C.

Basic fire resistant materials are particularly used in the iron and steel industries for the lining of metallurgical vessels and their parts, for example, arc-ovens, converter floors, ladles, tundishes, and run out channels. The materials are further utilized for filling gaps and in the lining of metallurgical dishes. Previously, substantially tar bound magnesite or dolomite materials, or chemically blocking masses have been used therefor. Tar bound materials have the disadvantage that they cannot be highly compressed or packed and also they burn out, primarily due to oxidation. Chemically blocking magnesite materials contain mostly water which during the heating thereof hydrates and destroys the dolomite parts.

It is an object of the present invention therefore, to devise a basic fire-resistant material which can be universally used and which does not have the disadvantages of known materials during use. This material should preferably be easily processable, namely have a certain plasticity, contain only organic binding means (free of water), be capable of being highly compressed or packed at low pressures, and have intermediate and final firmnesses through the heating region. Therebeyond, this material should preferably also be suitable for the manufacture of green and burned or calcined shaped bodies.

This object, as well as others which will hereinafter become apparent, is accomplished by the present invention by providing a basic fire resistant material wherein advantageously a sintered dolomite particle size is used which includes particle sizes up to 12 mm, preferably up to 8 mm diameter. It is considered essential that the proportion of fine particles of such materials have particle sizes smaller than 45 $\mu$m. This proportion, according to the invention, amounts to 10 to 50% by weight of the material and preferably 20 to 35% by weight. In the preferred implementation versions, this proportion contains 30 to 80% by weight of particle sizes smaller than 10 $\mu$m, as well as particle sizes smaller than 1 $\mu$m having a proportion by weight of more than 10%, preferably 10 to 30%.

As shown in the examples, it is possible to replace these very fine proportions partially or entirely by caustically burned dolomite, if sintered dolomite dust or powder is available which does not contain the finest portions in an adequate amount. In particular, caustically burned dolomite of dolomite hydrate has by nature very fine particle sizes and can be added to sintered dolomite dust, which usually has particle sizes up to 0.09 mm.

The organic binding means, which may be contained in the material up to 3 to 8% by weight, relating to 100 parts by weight of the fire resistant basic materials, contains 0.1 to 2% by weight of silicon organic compounds, again related to 100 parts by weight of the fire resistant basic materials. As such, silicon oils and silicon resins, which are commercially available, are suitable. Oils having higher viscosities and resins are advantageously employed and diluted with small amounts of hydrocarbons, for example, petroleum. The silicon-organic compounds, which may be polysiloxanes, should advantageously contain a proportion of silicon which, based or calculated as $SiO_2$, amounts to at least 20%.

Furthermore, the organic binding means preferably contains unsaturated oils, acids, resins or resinous acids in amounts between 2 and 5% by weight, related to the fire resistant basic materials. Amongst the materials being considered, colophony or resin, tall oil or liquid resin, abietic acid, olein and linseed oil have been shown to be particularly effective, which are also each available commercially with slightly differing compositions.

The organic binding means can also contain additions of, for example, paraffin and hydrocarbons as diluting or thinning means.

The generation of the mass is accomplished in a known manner by intensive mixing of its components, wherein it has been shown advantageous, to first mix the fire resistant coarse particles with fine particles and then to mix therewith the binding means mixture.

The shaped bodies can be obtained from the finished cold mass by compression in presses as so-called green stones. For this, as can be ascertained from the data in the examples, low pressures are adequate to attain high green densities. These green briquettes can also be subsequently subjected to a heat treatment and can then be used as heated or burned stones for lining purposes. The combustion temperatures are determined according to the desired purpose of use, and the duration of combustion according to the desired cold compression strength of the shaped bodies. Details therefor can be ascertained from a description of the examples.

The examples contained in the following table were manufactured by using Haldener sintered dolomite having the following distribution of particle sizes:
  0.09–0.3 mm: 5% by weight
  0.3–1.6 mm: 20% by weight
  1.6–3.15 mm: 10% by weight
  3.15–8 mm: 35% by weight The distribution of the particle size of the fine or finest particles of the sintered dolomite powder or dust (X, Y, Z) as well as of the caustically burned dolomite (K) can be ascertained from FIG. 1. The denotation X stands for a finely ground dust, manufactured by an oscillating disk mill. The powder Y was ground in a laborsphere mill, and the powder Z is an operatively manufactured product from a sifter plant. K denotes caustically burned dolomite. The fine and finest portions of powder of up to 0.09 mm inclusive of the caustically burned dolomite amounted to 30% by weight each of the fire resistant basic materials, and 70% by weight were used in the earlier-described sizes of the coarse particles.

The green densities and raw densities were obtained from testing cylinders having dimensions of 50×50 mm for the respective indicated pressing pressures. The same applies for the raw density. During Test Nos. 81, 87, 88 and 89, the sintered dolomite dust of the type Z was exchanged with increasing amounts of caustically burned dolomite, as the powder Z, as can be seen from FIG. 1, contains lower quantities of the finest materials than types X and Y. During judgment of the cold compression strength, as well as of the raw density, following the 1000° C. combustion, one has to take into account that the caustically burned dolomite showed a 4% calcining or glow loss, caused by partial hydration.

The plasticity and adhesive effect of the mass can be judged by manual deformation, so that a prediction concerning its suitability can be made.

into the gaps between the floor (lined with dolomite stones) and a stone provided with a flushing hole by means of a stamper or a rammer. The ladle was heated in the usual manner and operated in the steel works. After 50 charges, the wall lining was worn, and the fire resistant material was broken out. Several fragments of

| Test No. | 69 | 72 | 74 | 75 | 77 | 78 | 81 | 87 | 88 | 89 |
|---|---|---|---|---|---|---|---|---|---|---|
| Sintered Dolomite Dust | X | X | X | X | X | Y | Z | 20% Z | 10% Z | — |
| Dolomite Caustic | — | — | — | — | — | — | — | 10 | 20 | 30 |
| Liquid Resin or Tall Oil | 1.75 | — | — | 1.5 | 2.45 | 1.5 | 1.5 | 1.5 | 1.5 | 1.5 |
| Colofony or resin | 1.75 | 1.75 | 1.75 | 1.5 | — | 1.5 | 1.5 | 1.5 | 1.5 | 1.5 |
| Abietic Acid | — | — | — | — | 1.05 | — | — | — | — | — |
| Olein | — | 1.75 | — | — | — | — | — | — | — | — |
| Linseed Oil | — | — | 1.75 | — | — | — | — | — | — | — |
| Silicon Resin (Wacker Type MK) % | 0.5 | 0.5 | 0.5 | — | 0.5 | 0.5 | 0.5 | 0.5 | 0.5 | 0.5 |
| Silicon Oil (Wacker AK 2000) | — | — | — | 0.5 | — | — | — | — | — | — |
| Petroleum % | 1.0 | 0.67 | 0.67 | 1.0 | 0.5 | 1.0 | 1.0 | 1.0 | 1.0 | 1.0 |
| Paraffin | — | 0.33 | 0.33 | — | — | — | — | — | — | — |
| (Plasticity and Adhesive Effect X) | + | + | 0 | + | + | ++ | — | 0 | 0 | + |
| Green Density g/cm³ 4.9 N/mm² | | not determined | | | | 2.96 | 2.74 | 2.81 | 2.80 | 2.86 |
| Green Density g/cm³ 39.2 N/mm² | 2.93 | 2.95 | 2.87 | 2.96 | 2.96 | 3.00 | 2.93 | 2.98 | 2.98 | 2.95 |
| Raw Density g/cm³ (39.2 N/mm²) following 1000° C. combustion | 2.73 | 2.67 | 2.60 | 2.77 | 2.74 | 2.82 | 2.66 | 2.77 | 2.78 | 2.78 |
| Cold Compression Strength N/mm² | 31.7 | 28.9 | 23.4 | 37.3 | 27.6 | 46.7 | 21.0 | 15.8 | 21.4 | 21.5 |

In the foregoing table the following symbols denote performance under plasticity and adhesive effect:
++ = very good;
+ = good;
0 = satisfactory;
— = unsatisfactory.

So as to clarify the capability of densifying the masses, and the properties of the shaped bodies obtained therefrom, which were calcined or burned at different respective temperatures, test elements having the afore-described dimensions were manufactured and tested according to the prescription of Test No. 69. The results are summarized in the following table.

Dependence of the raw density on a specific pressing pressure;

| Pressing Pressure, Newtons/mm² | Raw Density, g/cm³ |
|---|---|
| 9.8 | 2.95 |
| 19.6 | 2.97 |
| 39.2 | 2.99 |
| 78.5 | 2.97 |
| 117.7 | 2.98 |

Temperature treatment of the shaped bodies in air; the test cylinders were pressed at 39.2N/mm²; the green density amounted to 2.97 g/cm³.

| Temperature °C. | Holding Time h | Raw Density g/cm³ | Weight loss % | Cold Compression Strength N/mm² |
|---|---|---|---|---|
| 300 | 16 | 2.84 | 0.58 | 26.1 |
| 600 | 16 | 2.68 | 4.14 | 31.0 |
| 800 | 16 | 2.70 | 4.54 | 26.1 |
| 1000 | 4 | 2.72 | 4.57 | 32.2 |
| 1200 | 4 | 2.77 | 4.52 | 47.7 |
| 1600 | 4 | 2.89 | 4.64 | 57.2 |

100 kg of the material according to the prescription of Test No. 69, consisting of 90% $Al_2O_3$, were stamped by means of a stamper or rammer in a steel pouring ladle the stamped mass were tested. The average raw density of eight fragments amounted to 2.7 g/cm³, the entire pour volume amounted to 19.9%. From one fragment, a cube was sawed off having 43 mm edge length, and its cold compression strength amounted to 35.5 Newtons/mm².

For manifold tests, the following observation concerning the effects of silicon resins and oils in fire resistant materials were obtained. These materials apparently cause a low degree of aftergrowth of the shaped bodies during temperature treatment, as well as low or small form changes, a reduced decline in strength, determined as cold compression strength in the region around 800° C., a small deformation of the stampings after densification in the press mold, a lower tendency towards further thickening of the mass to be formed during storage, and finally high green densities of the pressed bodies are obtained.

It is understood that the foregoing general and detailed descriptions are explanatory of the present invention and are not to be interpreted as restrictive of the scope of the following claims.

What is claimed is:

1. A basic fire-resistant material comprised of sintered dolomite and an organic binder having plastic properties which can be highly densified at low pressures, the shaped bodies of such material having intermediate and final strengths in a temperature range between 300° and 1600° C., wherein the binder comprises 3 to 8% by weight of the material and contains 0.1 to 2% by weight of a polysiloxane having a silicon content, calculated as $SiO_2$, of at least 20% by weight, and 20 to 35% by weight of the fire-resistant basic materials has a particle size smaller than 45 μm, of which 30 to 80% by weight are particles smaller than 10 μm and more than 10 and less than 30% by weight are particles smaller than 1 μm.

2. The basic fire resistant material according to claim 1, wherein the polysiloxane component is 0.3 to 1% by weight.

3. The basic fire resistant material according to claim 1, wherein the organic binder is selected from the group consisting of linseed oil, olein, abeitic acid, colophony, tall oil, and combinations thereof, in amounts between 2 and 5% by weight, based on the fire resistant basic materials.

4. A method of producing a fire-resistant shaped body, comprising the step of subjecting a basic fire-resistant material comprising sintered dolomite and an organic binder having plastic properties which can be highly densified at low pressures to a pressure greater than 5N/mm², wherein the binder comprises 3 to 8% by weight of the material and contains 0.1 to 2% by weight of a polysiloxanes having a silicon content, calculated as $SiO_2$, of at least 20% by weight, and 20 to 35% by weight of the fire-resistant basic materials has a particle size smaller than 45 μm, of which 30 to 80% by weight are particles smaller than 10 μm and more than 10 and less than 30% by weight are particles smaller than 1 μm.

5. The method of producing a fire resistant shaped body according to claim 4, wherein the pressure is greater than 30 Newtons/mm².

6. The method of producing a fire resistant shaped body according to claim 4, which further comprises the step of subjecting said formed shaped body to a temperature treatment in the range between 300° and 1600° C.

7. A fire-resistant shaped body formed by the method of claim 4.

8. The fire resistant shaped body according to claim 7, wherein the material is subjected to a pressure greater than 30 Newtons/mm² in forming the shaped body.

* * * * *